(12) United States Patent
Katz

(10) Patent No.: US 7,588,255 B2
(45) Date of Patent: Sep. 15, 2009

(54) COLLAPSIBLE CLAMPING WORK TABLE

(75) Inventor: Amir Katz, Bat-Hefer (IL)

(73) Assignee: ZAG Industries, Ltd., Rosh Ha'Ayin (IL)

( * ) Notice: Subject to any disclaimer, the term of this patent is extended or adjusted under 35 U.S.C. 154(b) by 222 days.

(21) Appl. No.: 11/270,455

(22) Filed: Nov. 10, 2005

(65) Prior Publication Data

US 2006/0118012 A1  Jun. 8, 2006

Related U.S. Application Data

(60) Provisional application No. 60/626,460, filed on Nov. 10, 2004.

(51) Int. Cl.
*B62B 1/00* (2006.01)
(52) U.S. Cl. .............. 280/47.27; 280/47.18; 280/47.19; 280/47.28
(58) Field of Classification Search .............. 280/47.27, 280/47.18, 47.19, 47.28
See application file for complete search history.

(56) References Cited

U.S. PATENT DOCUMENTS

| 364,385 | A | 6/1887 | Tremholm |
| 814,858 | A | 3/1906 | Markham |
| 1,024,469 | A | 4/1912 | Ballinger |
| 1,484,864 | A | 2/1924 | Bompart |
| 2,113,174 | A | 4/1938 | Earle |
| 2,474,722 | A | 6/1949 | Blume |
| 2,582,435 | A | 1/1952 | Howard |
| 2,784,004 | A | 3/1957 | Hamrick, Jr. |
| 2,846,233 | A | 8/1958 | Burg |
| 2,964,328 | A | 12/1960 | Muir |
| 3,064,989 | A | 11/1962 | Bellows |
| 3,104,889 | A | 9/1963 | Branch, Jr. |
| 3,147,748 | A | 9/1964 | Frank |
| 3,647,238 | A | 3/1972 | Mackey |
| 3,655,212 | A | 4/1972 | Krass et al. |
| 3,788,659 | A | 1/1974 | Allen |
| D230,801 | S | 3/1974 | Hickman et al. ............. D6/179 |
| 3,804,432 | A | 4/1974 | Lehrman |
| 3,941,399 | A | 3/1976 | Peters et al. |
| 4,034,684 | A | 7/1977 | Carson et al. ............... 108/127 |
| 4,105,055 | A | 8/1978 | Brenta ........................ 144/286 |
| 4,114,665 | A | 9/1978 | Decker ....................... 144/286 |
| D250,079 | S | 10/1978 | Hickman et al. ............. D6/178 |
| 4,127,260 | A | 11/1978 | Hickman .................... 269/139 |
| 4,154,435 | A | 5/1979 | Alessio ........................ 269/139 |
| 4,155,386 | A | 5/1979 | Alessio ........................ 144/286 |

(Continued)

FOREIGN PATENT DOCUMENTS

DE    819724    7/1949

(Continued)

*Primary Examiner*—Christopher P Ellis
*Assistant Examiner*—Katy Meyer
(74) *Attorney, Agent, or Firm*—Pillsbury Winthrop Shaw Pittman LLP

(57) ABSTRACT

A collapsible clamping table has open and closed positions. In the open position, a clamping table top is supported by legs in an elevated, generally level position. The legs and table top fold together to collapse the table for storage or transportation. A load platform and wheels mount to the table so that the table may be used as an L-shaped push cart when the table is in the closed position.

27 Claims, 8 Drawing Sheets

U.S. PATENT DOCUMENTS

| | | | |
|---|---|---|---|
| D253,212 S | 10/1979 | Maruscak et al. | D6/178 |
| 4,185,853 A | 1/1980 | Thurmond, Jr. | 280/652 |
| 4,192,541 A * | 3/1980 | Ferneau | 296/20 |
| D256,533 S | 8/1980 | Alessio | D6/178 |
| D256,641 S | 9/1980 | Wilson et al. | D6/178 |
| 4,230,329 A | 10/1980 | Johnson | 280/43.17 |
| 4,235,449 A | 11/1980 | Tarran | |
| 4,239,195 A | 12/1980 | Oltman et al. | 269/16 |
| 4,252,304 A | 2/1981 | Pettican | 269/139 |
| 4,278,243 A * | 7/1981 | Alessio | 269/16 |
| 4,284,286 A | 8/1981 | Lewallen | 280/30 |
| 4,315,632 A | 2/1982 | Taylor | |
| D266,128 S | 9/1982 | Ferdinand et al. | D6/178 |
| 4,415,149 A | 11/1983 | Rees | 269/88 |
| 4,494,626 A | 1/1985 | Ast | |
| 4,527,786 A | 7/1985 | Hsu | 269/154 |
| 4,531,752 A | 7/1985 | Diener | |
| 4,565,382 A | 1/1986 | Sherman | 280/47.18 |
| 4,611,823 A | 9/1986 | Haas | |
| 4,617,869 A | 10/1986 | Denomey | 108/132 |
| 4,865,346 A | 9/1989 | Carlile | |
| 4,909,491 A | 3/1990 | Cheng | 269/16 |
| 4,934,718 A | 6/1990 | Voegele | 280/30 |
| 4,969,496 A | 11/1990 | Romans | 144/286 |
| 4,974,871 A | 12/1990 | Mao | |
| 5,024,458 A | 6/1991 | Kazmark et al. | |
| 5,067,535 A | 11/1991 | Wolff | 144/286 |
| 5,201,536 A | 4/1993 | Bono et al. | 280/30 |
| 5,306,027 A | 4/1994 | Cheng | 280/30 |
| D351,295 S | 10/1994 | Noniewicz | D6/400 |
| 5,382,032 A | 1/1995 | Wilson | |
| 5,452,908 A | 9/1995 | Bencic | 280/47.35 |
| 5,536,034 A | 7/1996 | Miller | 280/641 |
| 5,542,740 A | 8/1996 | Chang | |
| D374,996 S | 10/1996 | Noniewicz | D6/400 |
| 5,642,895 A | 7/1997 | Wunder | 280/30 |
| 5,657,970 A | 8/1997 | Davis | 269/16 |
| D386,624 S | 11/1997 | Meisner et al. | D6/400 |
| 5,806,947 A | 9/1998 | Meisner et al. | 312/280 |
| 5,836,595 A | 11/1998 | Brice | |
| 5,863,052 A | 1/1999 | Roman | 280/30 |
| 5,893,572 A | 4/1999 | Parks | 280/47.18 |
| 5,941,543 A | 8/1999 | Kazmark et al. | |
| 5,957,472 A * | 9/1999 | Borgatti | 280/30 |
| 6,152,462 A | 11/2000 | Barrett | 280/30 |
| D436,268 S | 1/2001 | Ko | |
| 6,173,811 B1 | 1/2001 | Tornabene et al. | 182/20 |
| 6,196,560 B1 | 3/2001 | Ohlsson | 280/30 |
| 6,240,987 B1 | 6/2001 | Birkeland | 144/286.1 |
| 6,286,824 B1 | 9/2001 | Sagol | 269/99 |
| 6,341,788 B1 | 1/2002 | Ciccone | 280/47.28 |
| 6,343,783 B1 | 2/2002 | Ke | 269/139 |
| 6,345,829 B1 | 2/2002 | Mueller | 280/47.18 |
| 6,360,797 B1 | 3/2002 | Brazell et al. | 144/286.1 |
| 6,371,495 B2 | 4/2002 | Thompson | 280/30 |
| 6,471,236 B1 | 10/2002 | Eskridge | 280/648 |
| 6,530,583 B1 | 3/2003 | Mueller | 280/47.18 |
| 6,578,856 B2 | 6/2003 | Kahle | 280/30 |
| 6,588,775 B2 | 7/2003 | Malone, Jr. | |
| 6,601,859 B2 | 8/2003 | Durham | |
| D482,208 S | 11/2003 | Fortin et al. | D6/400 |
| D482,553 S | 11/2003 | Fortin et al. | D6/511 |
| 6,651,774 B2 | 11/2003 | Yoo | |
| 6,659,440 B2 | 12/2003 | Levy | 269/45 |
| D491,962 S | 6/2004 | Laga | D15/141 |
| 6,745,804 B2 | 6/2004 | Welsh et al. | 144/287 |
| 6,749,189 B1 | 6/2004 | Wolff et al. | 269/139 |
| 6,769,674 B2 | 8/2004 | Chang | 269/139 |
| 6,848,684 B2 | 2/2005 | Fortin et al. | 269/139 |
| 6,880,835 B2 * | 4/2005 | Tornabene et al. | 280/30 |
| 6,883,793 B2 * | 4/2005 | Fortin et al. | 269/139 |
| 7,090,210 B2 * | 8/2006 | Lawrence et al. | 269/139 |
| 2001/0045718 A1 | 11/2001 | Boirum | 280/47.26 |
| 2002/0125662 A1* | 9/2002 | Magness | 280/30 |
| 2003/0015851 A1 | 1/2003 | Hahn | 280/47.24 |
| 2003/0024604 A1 | 2/2003 | Derecktor | 144/286.5 |
| 2004/0051223 A1 | 3/2004 | Fortin et al. | 269/139 |
| 2004/0051224 A1* | 3/2004 | Fortin et al. | 269/139 |
| 2004/0195790 A1 | 10/2004 | Wong Hahn | 280/47.19 |
| 2004/0221923 A1 | 11/2004 | Welsh et al. | 144/287 |
| 2005/0035517 A1 | 2/2005 | Lawrence et al. | 269/139 |

FOREIGN PATENT DOCUMENTS

| | | |
|---|---|---|
| DE | 1776993 | 11/1958 |
| DE | 1804835 | 1/1960 |
| DE | 1963059 | 7/1970 |
| DE | G9014007.9 U1 | 3/1992 |
| DE | 4134867 A1 | 4/1992 |
| DE | 29605040 U1 | 7/1996 |
| EP | 0 523 132 A2 | 3/1993 |
| EP | 0 391 115 B1 | 6/1993 |
| EP | 0681890 B1 | 11/1995 |
| EP | 1 400 320 A1 | 3/2004 |
| EP | 1 400 321 A1 | 3/2004 |
| GB | 2 025 831 A | 1/1980 |
| GB | 2051690 A | 1/1981 |
| GB | 2247650 A | 3/1992 |
| JP | 07215217 A | 8/1995 |

* cited by examiner

COLLAPSIBLE CLAMPING WORK TABLE

CROSS REFERENCE

This application claims priority from U.S. Provisional Patent Application No. 60/626,460, filed Nov. 10, 2004, titled "Collapsible Clamping Work Table," the contents of which are incorporated herein in their entirety.

BACKGROUND OF THE INVENTION

1. Field of the Invention

This invention relates to collapsible work tables. Aspects of this invention also relate to L shaped carts.

2. Description of Related Art

Various collapsible work tables are known in the art. See U.S. Pat. Nos. 4,127,260, 4,252,304, D253,212, 6,343,783, 4,415,149, and 4,278,243. However there remains a need for an improved collapsible work table that is simpler to operate, has an improved support structure, is less expensive to manufacture, and/or is more versatile.

SUMMARY OF THE INVENTION

Accordingly, one aspect of one or more embodiments of this invention provides an improved collapsible work table that is simpler to operate, has an improved support structure, is less expensive to manufacture, and/or is more versatile.

Another aspect of one or more embodiments of this invention provides a collapsible clamping table that has open and closed positions. In the open position, a clamping table top is supported by legs in an elevated, generally level position. The legs and table top fold together to collapse the table for storage or transportation.

Another aspect of one or more embodiments of this invention provides a collapsible table that becomes an L-shaped push cart when the table is closed/collapsed.

Another aspect of one or more embodiments of this invention provides a collapsible table that includes a table top and a first support leg pivotally connected to the table top. The table top pivots between open and closed positions relative to the first support leg. The table also includes a second support leg pivotally connected to the first support leg. The second support leg pivots between open and closed positions relative to the first support leg. The table also includes an extendable table top support leg extending between the table top and the first support leg. The table top support leg is -extendable from a closed position to an open position. The second support leg, the table top, and the extendable table top support leg are operatively connected to each other such that the second support leg, the table top, and the extendable table top support leg synchronously move between their open and closed positions.

According to a further aspect of one or more of these embodiments, the table further includes a locking mechanism that selectively locks the extendable table top support leg in its open position.

According to a further aspect of one or more of these embodiments, the table occupies substantially less space when the table top is in the closed position than when the table top is in the open position.

According to a further aspect of one or more of these embodiments, the table top comprises a clamping table top. The clamping-table top may include a first table top section, a second table top section slidingly connected to the first table top section to enable the table top sections to slide toward and away from each other, and a user-operated clamping mechanism operatively extending between the first and second table top sections. The first and second table top sections may define a top surface of the table top.

According to a further aspect of one or more of these embodiments, the table also includes at least two wheels rotatably mounted to a lower portion of one of the first and second support legs, and a load platform mounted to a lower portion of one of the first and second support legs. The load platform is shaped and configured to support a load thereon. The table defines an L-shaped load transportation cart when the table top is in its closed position and the load platform is in an open position. The load platform may pivotally connect to the one of the first and second support legs for relative pivotal movement between stowed and open positions, wherein the load platform and the one of the first and second support legs generally form an L shape when the platform is in the open position, and wherein the platform and the one of the first and second support legs are generally parallel-to each other when the platform is in the stowed position. The load platform and the at least two wheels may be mounted to a lower portion of the same or different ones of the first and second support legs, respectively.

According to a further aspect of one or more of these embodiments, the wheels do not contact a ground beneath the table when the table top is in its open position and the table is resting on level ground.

According to a further aspect of one or more of these embodiments, the table further includes a first brace pivotally connected to the second support leg, and a second support brace pivotally connected to the table top support leg. The first and second support braces pivotally connect to each other at a pivot point. The pivot point slidingly connects to the first support leg.

According to a further aspect of one or more of these embodiments, the table top and second support leg pivot in opposing rotational directions relative to the first support leg when the table top and support leg move into their respective open positions.

Another aspect of one or more embodiments of the present invention provides a collapsible table that includes a table top, and first and second support legs operatively connected to the table top. The second leg is movable between open and closed positions relative to the first support leg. The support legs support the table top in an elevated position when the second support leg is in the open position and the table is resting on level ground. The table also includes at least two wheels rotatably mounted to the lower portion of one of the support legs. The table further includes a load platform movably mounted to a lower portion of one of the support legs for movement relative to the one of the support legs between open and stowed positions. When the second support leg is in its closed position, moving the load platform from its stowed to its open position locks the second support leg into its closed position. The table top may be a clamping table top.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which from a part of this original disclosure.

DETAILED DESCRIPTION OF PREFERRED EMBODIMENTS

Figure 1:
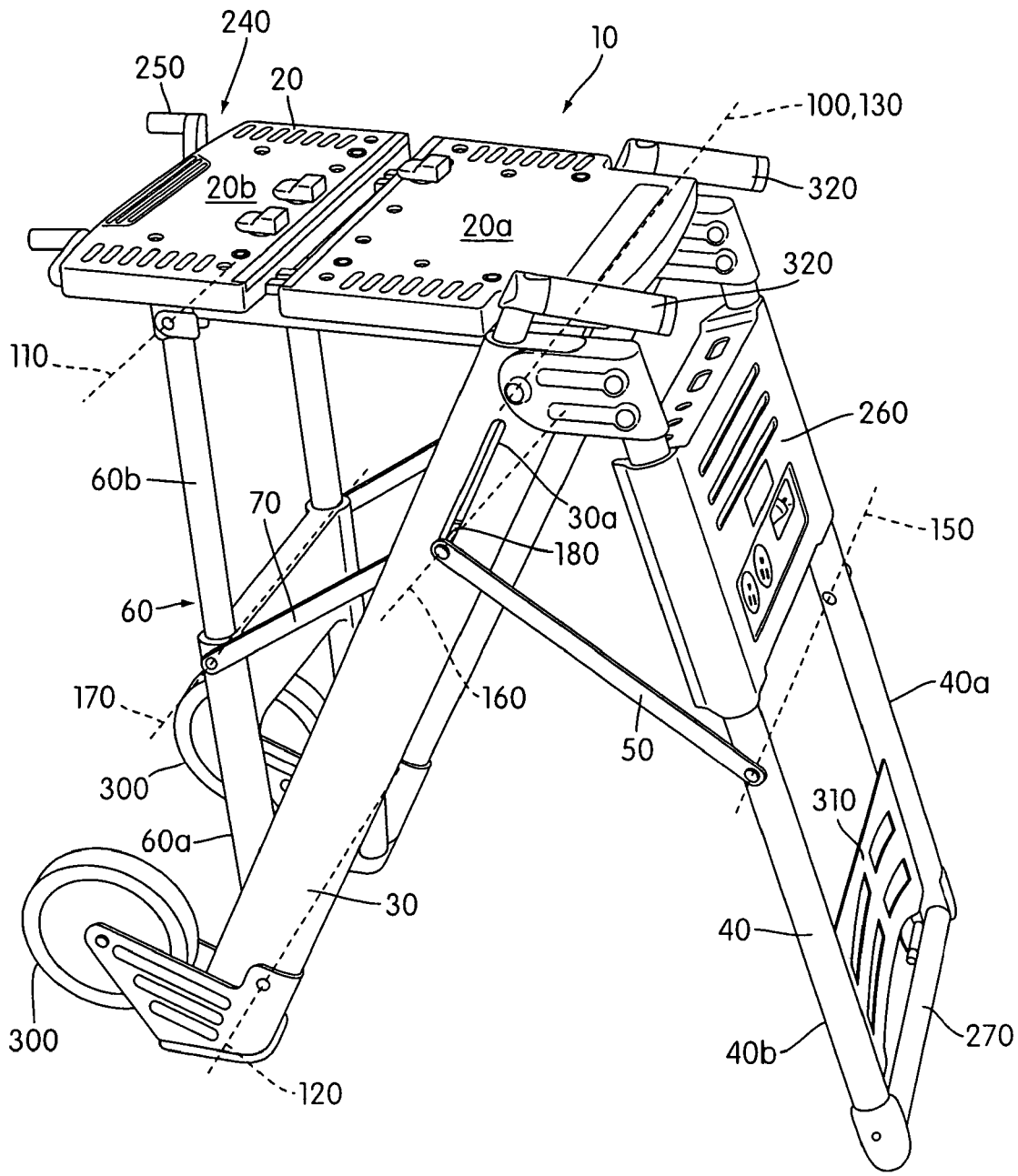
FIG. 1 is a side perspective view of a clamping table according to an embodiment of the present invention, wherein the clamping table is in an open position.

As shown in FIG. 1, a clamping table 10 includes a clamping table top 20, a main support leg 30, a secondary support leg 40, a secondary support brace 50, a table top support leg 60, and a table top support leg brace 70.

Figure 2:
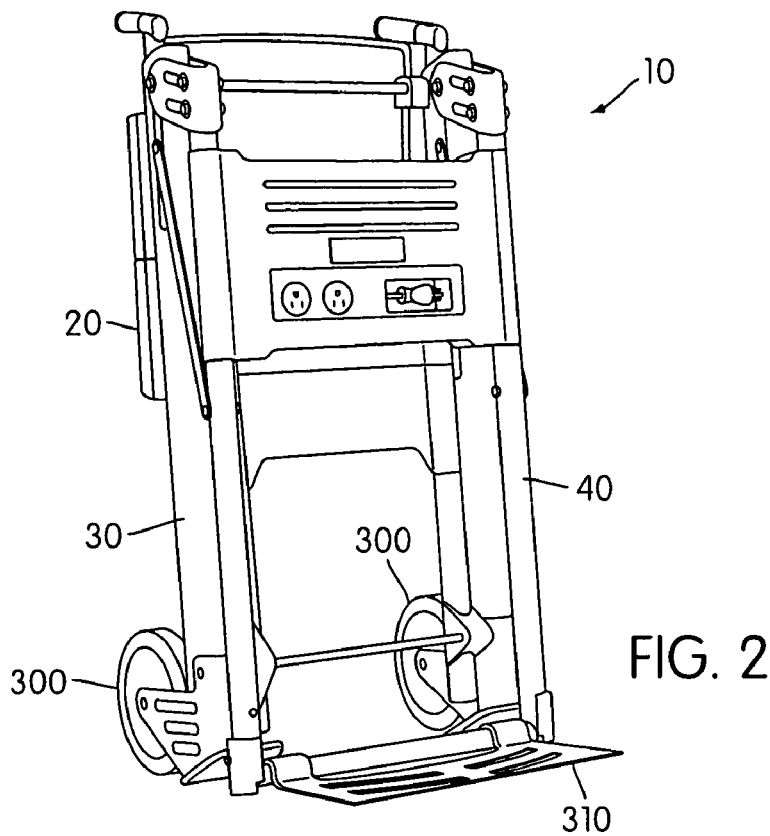
FIG. 2 is a front perspective view of the clamping table in FIG. 1 in a closed position.

As shown in FIGS. 1 and 2, an operator can selectively move the table 10 between an open position (FIG. 1) and a closed/collapsed positions (FIG. 2). In the open position illustrated in FIG. 1, the clamping table top 20 is positioned in a generally level, usable position. The support legs 30, 40, 60 provide structural support to fix the table top 20 in an elevated position relative to the ground. The main and secondary support legs 30, 40 contact the ground to support the table top 20. Conversely, as shown in FIG. 2, an operator can collapse the clamping table 10 into a closed position that makes it easier to move and/or store the clamping table 10 when not being used as a table. The opening and closing mechanism of the clamping table 10 is described below.

The clamping table top 20 pivotally connects to the main support leg 30 for relative pivotal movement about a pivot axis 100 between an open, usable position (FIG. 1) and a closed position (FIG. 2). The clamping table top 20 also pivotally connects to the table top support leg 60 for relative pivotal movement about a pivot axis 110. The table top support leg 60 pivotally connects to the main support leg 30 for relative pivotal movement about a pivot axis 120.

The secondary support leg 40 pivotally connects to the main support leg 30 for relative pivotal movement about a pivot axis 130 between an open position (FIG. 1) and a closed position (FIG. 2). While the pivot axis 130 is coaxial with the pivot axis 100 in the illustrated embodiment, the pivot axes 100, 130 may alternatively be offset from each other without deviating from the scope of the present invention.

The secondary support leg 40 pivotally connects to the secondary support brace 50 for relative pivotal movement about a pivot axis 150. The secondary support brace 50 pivotally connects to the table top support leg brace 70 for relative pivotal movement about a pivot axis/pivot point 160.

The table top support leg brace 70 pivotally connects to the table top support leg 60 at a pivot axis 170.

A pin 180 connects to the secondary support brace 50 and the table top support leg brace 70 at or near the pivot axis 160. The pin 180 mounts to the main support leg 30 for relative sliding movement along a longitudinal direction of the main support leg 30. In the illustrated embodiment, the sliding connection comprising a longitudinal slot 30a in the main support leg 30. The pin 180 fits into and slides along this slot 30a such that the shape and direction of the slot 30a control the direction that the pin 180 may move relative to the main support leg 30. While the slot 30a and pin 180 are used in the illustrated embodiment to define the sliding connection between the pivot axis/point/joint 160 and the main support leg 30, the pivotal joint 160 may alternatively slidingly connect to the main support leg 30 using any other suitable mechanism (e.g., a ring attached to the joint 160 and slidingly fit onto an elongated longitudinal rod on the main support leg 30) without deviating from the scope of the present invention.

As shown in FIG. 1, the table top support leg 60 is extendable from a closed/retracted position (shown in FIG. 2) to an open/extended position (shown in FIG. 1). In the illustrated embodiment, the extendable support leg 60 comprises telescopically-connected lower and upper members 60a, 60b, respectively. The upper member 60b pivotally connects to the table top 20 at the pivot axis 110. The lower member 60a pivotally connects to the main support leg 30 at the pivot axis 120 and to the table top support leg brace 70 at the pivot axis 170.

Figure 3:
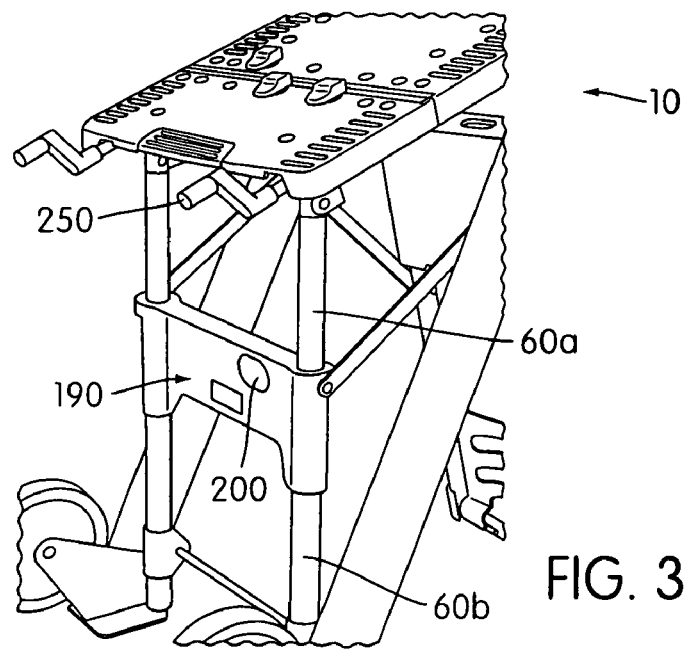
FIG. 3 is a side perspective view of the clamping table in FIG. 1 in a mostly open position.
Figure 4:
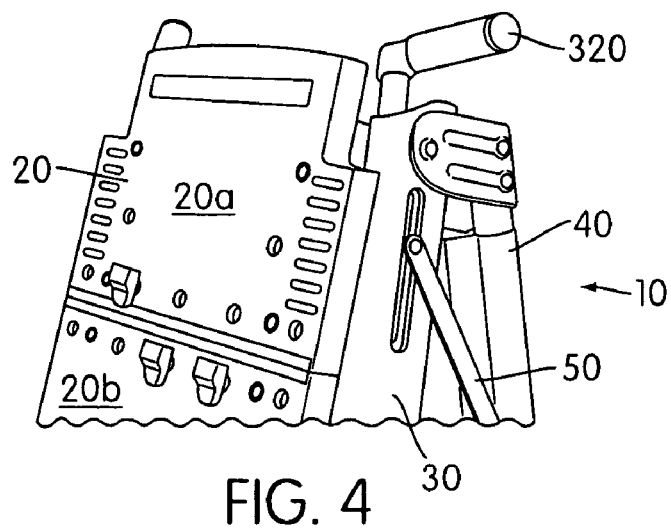
FIG. 4 is a partial side perspective view of the clamping table in FIG. 1 in a partially closed position.
Figure 5:
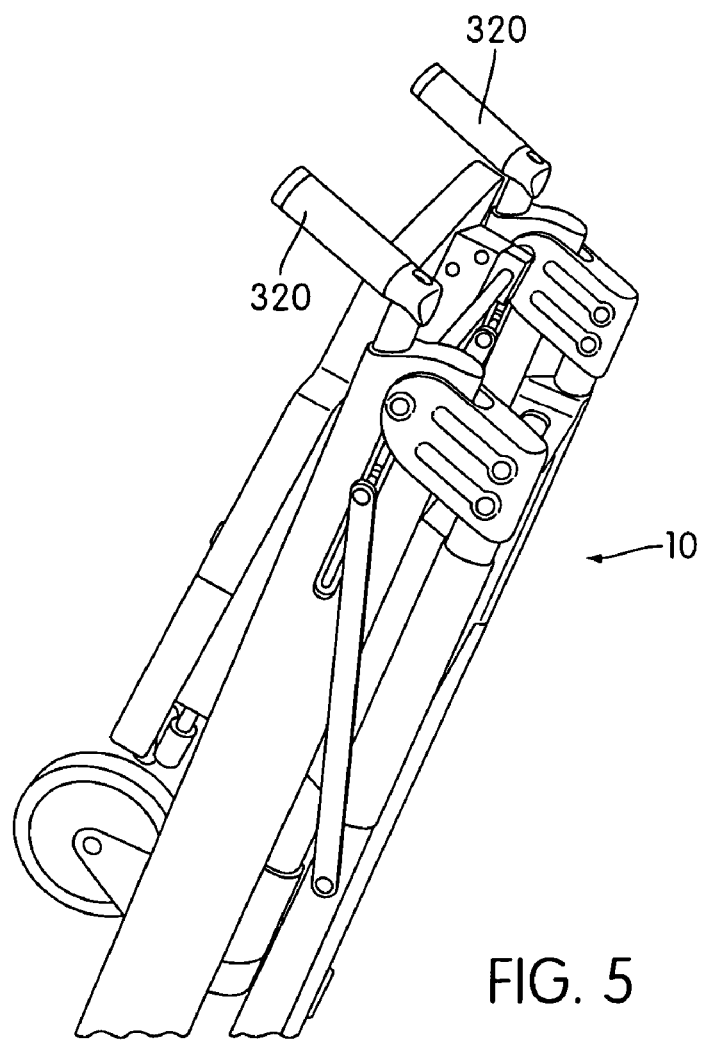
FIG. 5 is a partial side perspective view of the clamping table in FIG. 1 in a closed position.

As shown in FIG. 3, a locking mechanism 190 operatively connects the upper and lower members 60a, 60b of the extendable support leg 60. The locking mechanism 190 selectively locks the extendable support leg 60 in the extended/open position shown in FIG. 1 to lock the table top 20 in an open position relative to the main support leg 30. The locking mechanism 190 includes a release button 200. Actuation of the release button 200 unlocks the locking mechanism 190 to allow the table top 20 to move into its closed position relative to the main support leg 30 (see FIGS. 2, 8).

Figure 8:
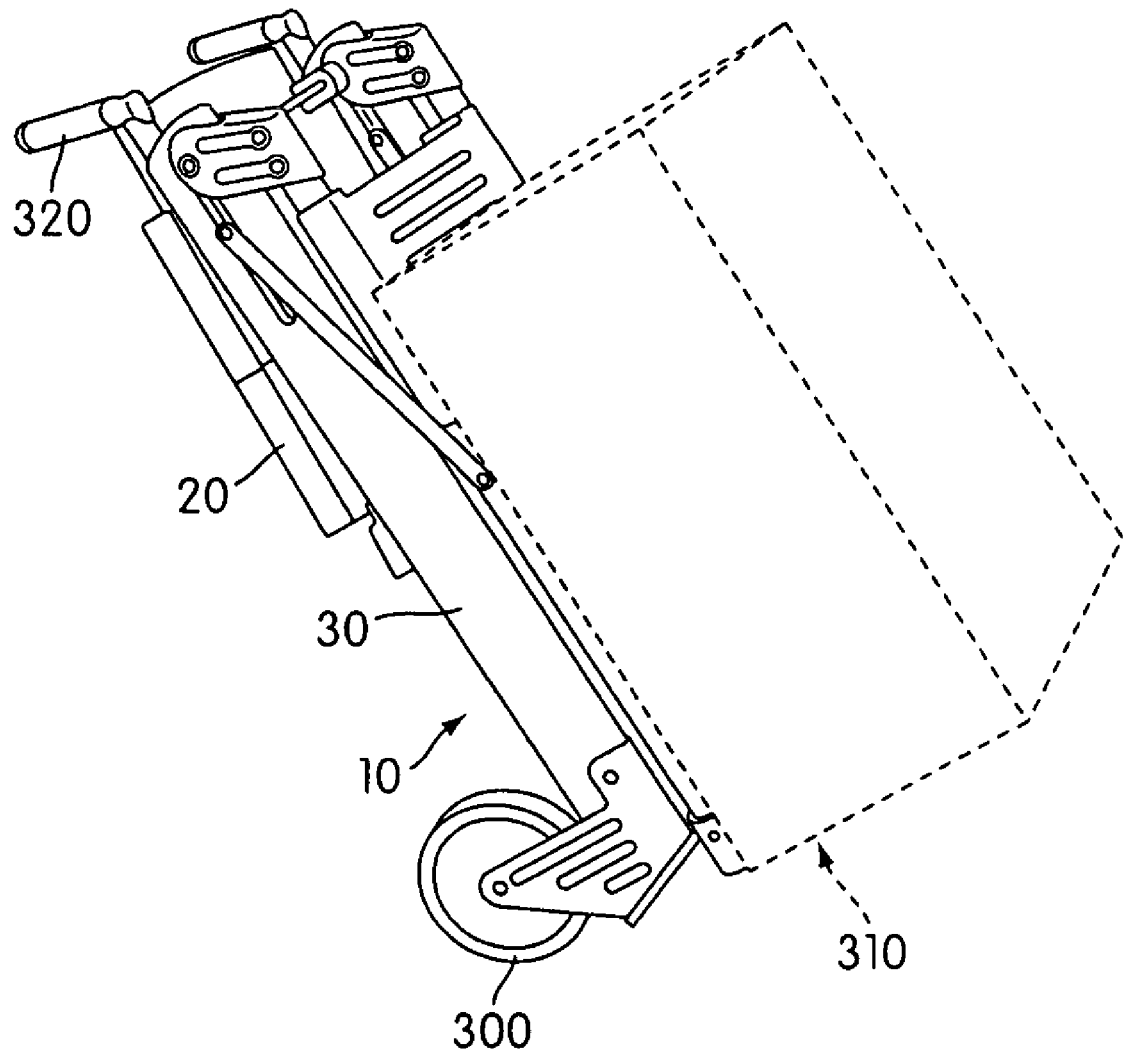
FIG. 8 is a side perspective view of the clamping table in FIG. 1 being used as an L-shaped cart.
Figure 10:
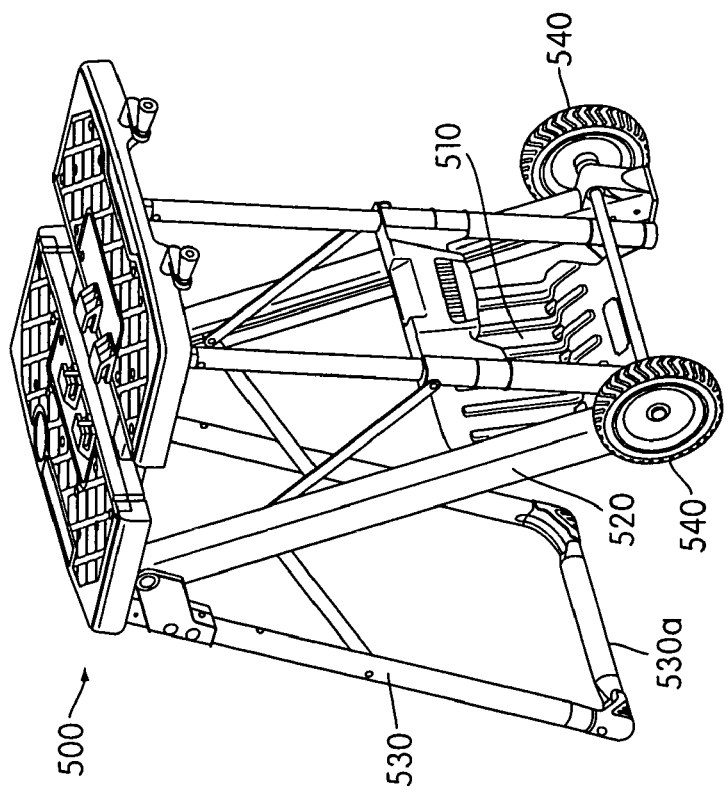
FIGS. 10 and 11 are perspective views of the clamping table in FIG. 9.

As shown in FIG. 1, the table top 20 and secondary support leg 40 are operatively connected to each other via the support braces 50, 70, table top support leg 60, and main support leg 30 such that the table top 20 and secondary support leg 40 open and close together. FIGS. 1, 3, 4, 5, 2 show the sequential closing of the table 10 from the open, usable position (FIG. 1) to the collapsed/closed position (FIG. 2). When the table 10 is in the collapsed position as shown in FIGS. 2 and 8, the table top 20 and support legs 30, 40, 60 are all preferably generally parallel to each other so as to reduce the space taken up by the table 10.

As shown in FIG. 1, the pivot axes 100, 110, 120, 130, 150, 160, 170 are all preferably parallel to and offset from each other. However, as noted above, pivot axes 100, 130 are preferably coaxial with each other. The pivot axes 100, 110, 120, 130, 150, 160, 170 define the apexes of triangles defined by various portions of the table top 20, support legs 30, 40, 60, and braces 50, 70. These triangles strengthen the table 10 when it is open and being used as a table.

To move the table 10 from the closed to the open position, an operator need only lift the table top 20 from its closed to its open position. The movement of the table top 20 into its open position forces the secondary support leg 40 into its open position. When the table top 20 moves into its open position, the table top support leg 60 extends into its fully extended position, at which point the locking mechanism 190 preferably automatically locks the support leg 60 in its extended position. To close the table 10, an operator need only reverse these steps after actuating the release button 200 of the locking mechanism 190.

As shown in FIG. 1, the table top 20 is a clamping table top that includes slidingly connected table top sides 20a, 20b. A clamping mechanism 240 comprises rotatable tightening knobs 250 and associated threaded rods (not shown) that operatively extend between the sides 20a, 20b to enable a user to selectively move the sides 20a, 20b toward and away from each other to clamp and unclamp a work piece to the table top 20. The clamping mechanism 240 may alternatively comprise any other suitable clamping mechanism as would be understood by one of ordinary skill in the art without deviating from the scope of the present invention. Moreover, the table top 20 may omit a clamping feature altogether without deviating from the scope of the present invention.

Throughout this description, the support legs 30, 40, 60 and braces 50, 70 are described as singular structures. However, as shown in FIGS. 1-8, each of these support legs 30, 40, 60 and braces 50, 70 may comprise a plurality of components. For example, the main support leg 30 includes mirror-image, interconnected left and right main support leg portions. The secondary support leg 40 likewise comprises left and right secondary support leg portions 40a, 40b that are interconnected by cross-braces 260, 270.

As illustrated in FIGS. 1, 2, and 8, the table 10 converts into an L-shaped cart when the table 10 is in its closed position. As shown in FIG. 1, two wheels 300 rotatably connect to a base (i.e., lower portion) of the main support leg 30. A load platform 310 pivotally connects to a base (i.e., lower portion) of the secondary support leg 40. The load platform 310 pivots relative to the secondary support leg 40 between a stowed position (FIG. 1), in which the platform 310 is substantially parallel to the secondary support leg 40, and an open, operative position (FIGS. 2, 8), in which the platform 310 is positioned to support a load thereon. As shown in FIG. 2, when the platform 310 is in its operative position, it preferably generally forms an L shape with the secondary support leg 40.

While the illustrated platform 310 pivotally connects to the secondary support leg 40, the platform 310 may alternatively rigidly connect to the secondary support leg 40 in an L shape without deviating from the scope of the present invention.

While the illustrated wheels 300 connect to the main support leg 30 and the platform 310 connects to the secondary support leg 40, the wheels 300 and platform 310 may alternatively connect to any other suitable part of the table 10. Moreover, while the wheels 300 and platform 310 directly connect to the support legs 30, 40, respectively, the wheels 300 and platform 310 nonetheless indirectly connect to every other part of the table 10.

While the illustrated platform 310 comprises a generally planar surface, the platform 310 may alternatively comprise any other type of platform suited to supporting a load thereon. For example, the platform 310 may comprise spaced forks such as are used on a forklift.

The platform 310 preferably rests flat on the ground when the table 10 is closed and positioned in the upright position as shown in FIG. 2. This flat position facilitates the loading and unloading of loads onto and off of the platform 310.

The wheels 300 are generally disposed near an apex of the "L" shape so that the table 10 can function as an L-shaped load transportation cart. Conversely, when the table 10 is in the open position (FIG. 1), the wheels 300 are preferably disposed above the ground to decrease the likelihood of the table 10 inadvertently shifting during use as a table.

Figure 6:
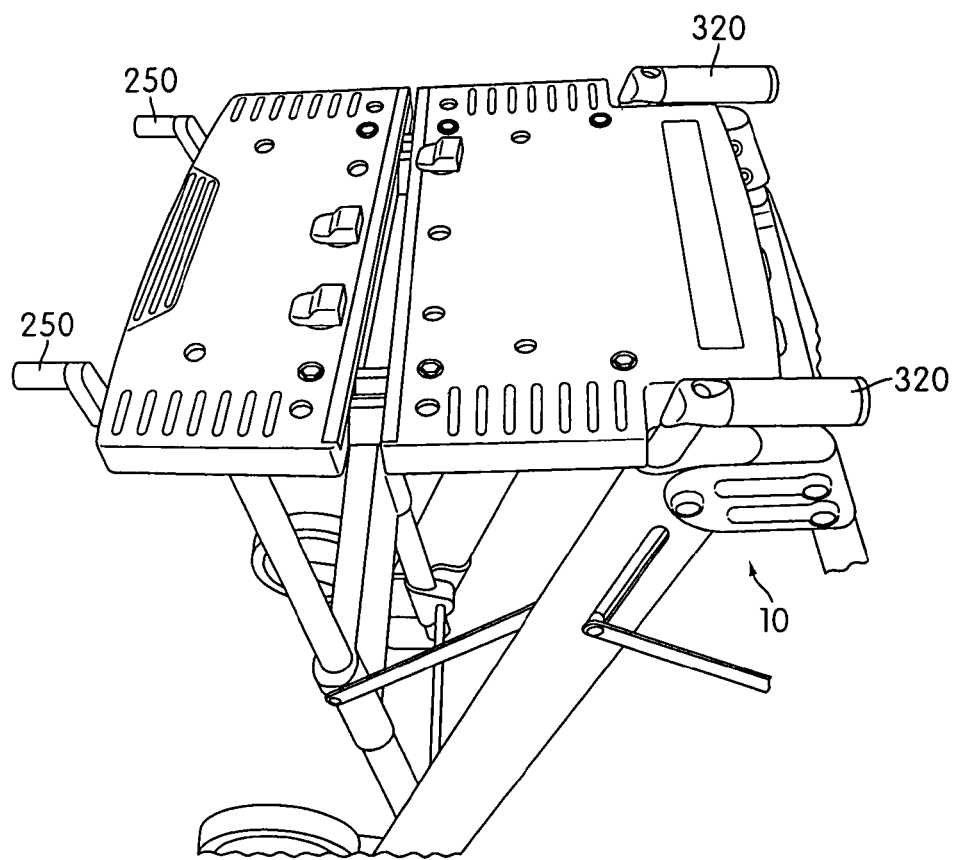
FIG. 6 is a partial top perspective view of the clamping table in FIG. 1 in an open position.

As shown in FIGS. 1-6 and 8, grab handles 320 extend upwardly from the main support leg 30. The grab handles 320 pivot about an axis that generally extends along a longitudinal direction of the main support leg 30 between. The handles 320 pivot between active positions (FIG. 8) and stowed positions (FIG. 6). In the active position shown in FIG. 8, the grab handles 320 form the handles of the L cart and help an operator to move the closed table 10. Conversely, as shown in FIG. 6, the handles 320 may be pivoted into an unobtrusive position when the table 10 is open and being used as a table. The handles 320 preferably move into a position in which they do not extend above a surface of the table top 20 when the table 10 is being used as a table.

Figure 7:
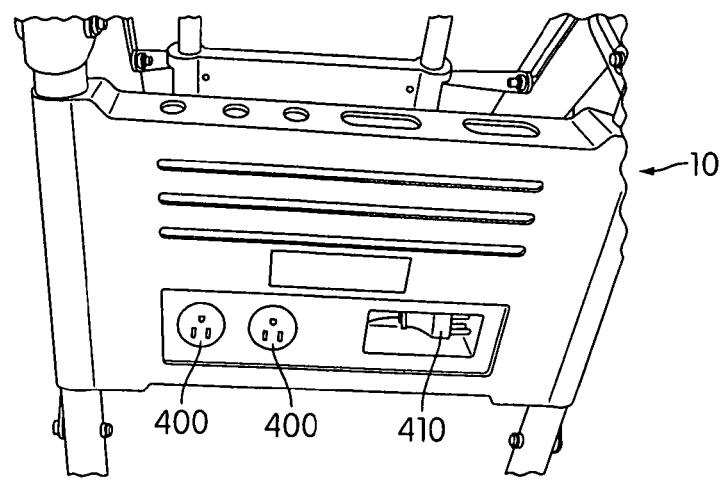
FIG. 7 is a partial front perspective view of the clamping table in FIG. 1.

As shown in FIG. 7, electrical outlets 400 may be provided on the table 10 to facilitate the use of electric power tools in conjunction with the table 10. The table 10 may include an integral extension cord to provide power to the outlets 400 or may include a relatively short plug 410 so that an operator can provide power to the outlets 400 via an external extension cord.

Figure 14:
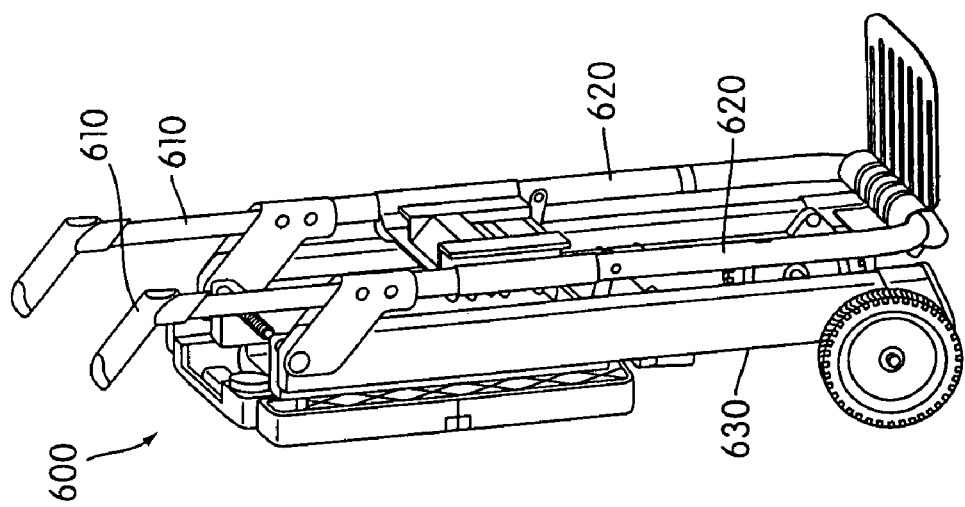
FIG. 14 is a perspective view of the clamping table in FIG. 13 being used as an L-shaped cart.
Figure 13:
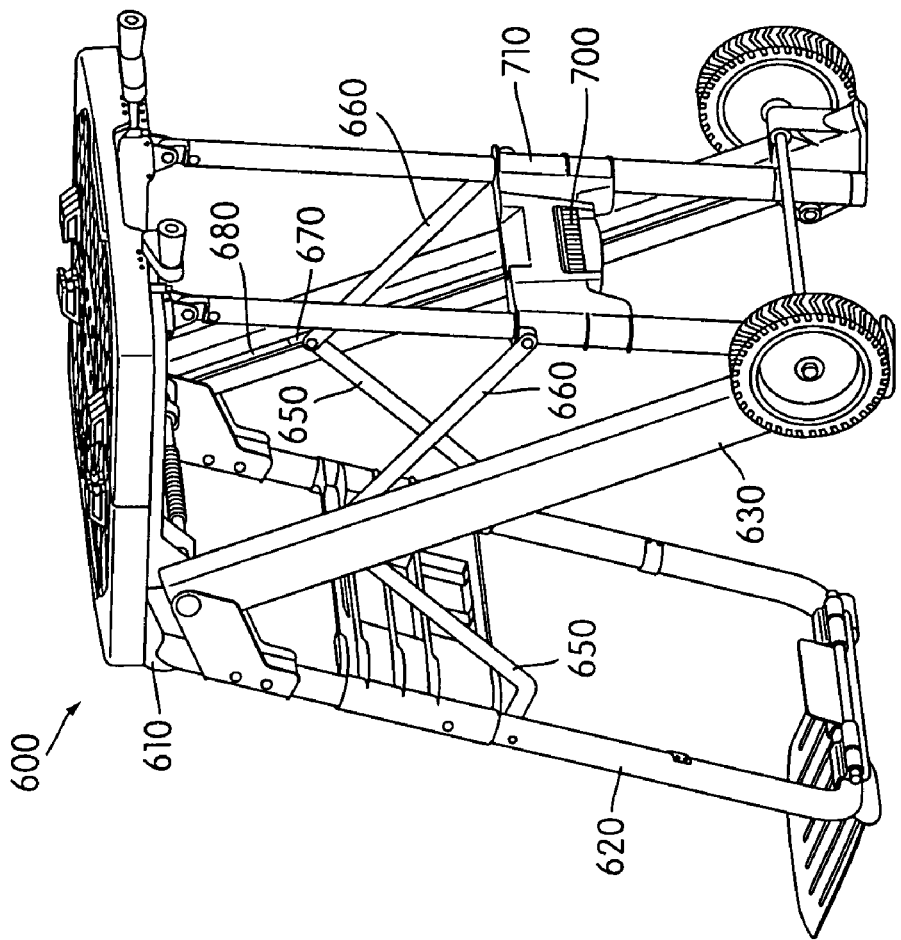
FIG. 13 is a perspective view of a clamping table according to an alternative embodiment of the present invention in an open position.

FIGS. 13 and 14 illustrate a work table 600 according to an alternative embodiment of the present invention. The work table 600 is generally similar to the work table 10. Accordingly, redundant descriptions of the similar features are omitted. As shown in FIGS. 13 and 14, the handles 610 telescopically extend from an upper end of the secondary support leg 620 so as to be extendable between a closed position (shown in FIG. 13) that does not interfere with use of the open table 600, and an open position (shown in FIG. 14) for use as the handles 610 of the L-shaped cart 600. As shown in FIG. 13, the secondary support braces 650 and table top support leg braces 660 pivotally connect to each other and to guides 670 (only one is shown) that linearly slide along longitudinal tracks 680 (only one is shown) disposed on inner sides of the main support leg 630. As shown in FIG. 13, a lever 700 is disposed on the table top support leg 710. The lever 700 operatively connects to the telescopic portions of the table top support leg 710 to enable a user to release the table top support leg 710 from its locked, extended position.

FIGS. 9-12 illustrate a clamping work table 500 according to an alternative embodiment of the present invention. The work table 500 is generally similar to the work tables 10, 600. Accordingly, redundant descriptions of the similar features are omitted. The work table 500 differs from the table 10 in that a load platform 510 pivotally connects to a main support leg 520 instead of a secondary support leg 530 as in the work table 10. Accordingly, the load platform 510 and wheels 540 both connect to the main support leg 530.

Figure 9:
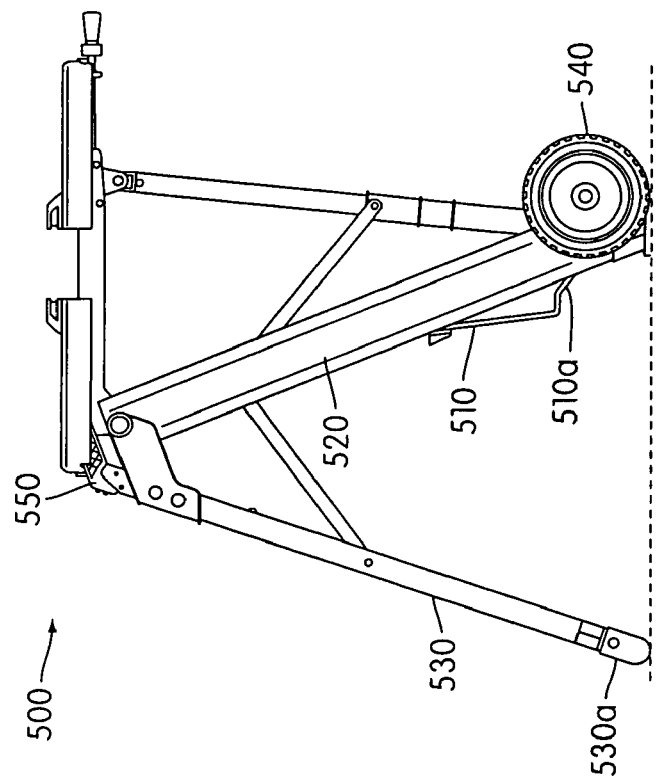
FIG. 9 is a side view of a clamping table according to an alternative embodiment of the present invention.
Figure 12:
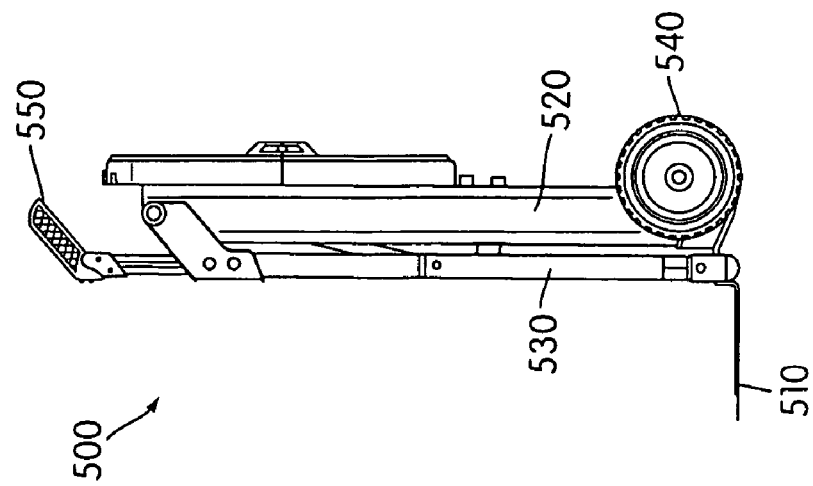
FIG. 12 is a left side view of the clamping table in FIG. 9 being used as an L-shaped cart.
Figure 11:
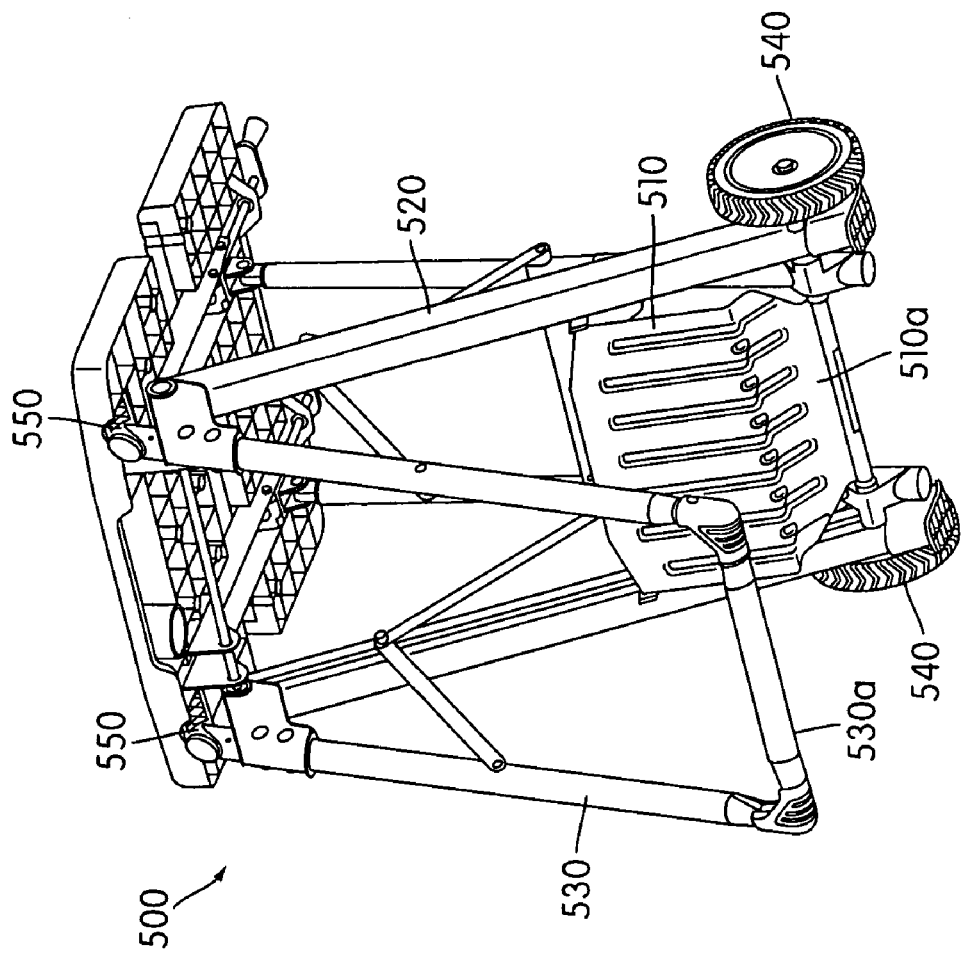

As best illustrated in FIG. 9, to move the table 500 from its open operative position (shown in FIG. 9) to its closed/hand truck position (shown in FIG. 12), the support legs 520, 530 are collapsed, and then the platform 510 is pivoted downwardly from the position shown in FIG. 9 to its lowered, L-shaped cart position. The platform 510 includes a curved section 510a that enables it to pivot over a lower cross member 530a of the secondary leg 530 into the L-shaped position. The curved section 510a may engage the cross member 530a to keep the secondary support leg 530 in the closed position when the platform 510 is in its lowered/open/L-shaped cart position. As shown in FIG. 12, cart handles 550 telescopically connect to the secondary leg 530, and extend to create the handles of the L-shaped cart.

The foregoing description is included to illustrate the operation of the preferred embodiments and is not meant to limit the scope of the invention. To the contrary, those skilled in the art should appreciate that varieties may be constructed and employed without departing from the scope of the invention, aspects of which are recited by the claims appended hereto.

What is claimed is:

1. A collapsible table comprising:
   a table top;
   a first support leg pivotally connected to the table top, wherein the table top pivots between open and closed positions relative to the first support leg;
   a second support leg pivotally connected to the first support leg, wherein the second support leg pivots between open and closed positions relative to the first support leg; and
   a slidingly extendable table top support leg extending between the table top and the first support leg, the table top support leg being slidingly extendable from a closed position to an open position, the slidingly extendable table top support leg being pivotally connected to the table top, wherein sliding extension of the table top support leg from its closed position to its open position increases a length of the table top support leg,
   wherein the second support leg, the table top, and the extendable table top support leg are operatively connected to each other such that the second support leg, the table top, and the extendable table top support leg synchronously move between their open and closed positions.

2. The collapsible table of claim 1, further comprising a locking mechanism that selectively locks the extendable table top support leg in its open position.

3. The collapsible table of claim 1, wherein the table occupies substantially less space when the table top is in the closed position than when the table top is in the open position.

4. The collapsible table of claim 1, wherein the table top comprises a clamping table top.

5. The collapsible table of claim 4, wherein the clamping table top comprises:
   a first table top section;
   a second table top section slidingly connected to the first table top section to enable the table top sections to slide toward and away from each other; and
   a user-operated clamping mechanism operatively extending between the first and second table top sections.

6. The collapsible table of claim 5, wherein the first and second table top sections define a top surface of the table top.

7. The collapsible table of claim 1, further comprising:
   at least two wheels rotatably mounted to a lower portion of one of the first and second support legs; and
   a load platform mounted to a lower portion of one of the first and second support legs, the load platform being shaped and configured to support a load thereon,
   wherein the table defines an L-shaped load transportation cart when the table top is in its closed position and the load platform is in an open position.

8. The collapsible table of claim 7, wherein the load platform pivotally connects to the one of the first and second support legs for relative pivotal movement between stowed and open positions, wherein the load platform and the one of the first and second support legs generally form an L shape when the platform is in the open position, and wherein the platform and the one of the first and second support legs are generally parallel to each other when the platform is in the stowed position.

9. The collapsible table of claim 7, wherein the load platform and the at least two wheels are mounted to a lower portion of different ones of the first and second support legs, respectively.

10. The collapsible table of claim 7, wherein the load platform and the at least two wheels are both mounted to a lower portion of one of the first and second support legs.

11. The collapsible table of claim 7, wherein the wheels do not contact a ground beneath the table when the table top is in its open position and the table is resting on level ground.

12. The collapsible table of claim 1, further comprising:
   a first brace pivotally connected to the second support leg; and
   a second support brace pivotally connected to the table top support leg, wherein the first and second support braces pivotally connect to each other at a pivot point,
   wherein the pivot point slidingly connects to the first support leg.

13. A collapsible table comprising:
   a table top;
   a first support leg pivotally connected to the table top, wherein the table top pivots between open and closed positions relative to the first support leg;
   a second support leg pivotally connected to the first support leg, wherein the second support leg pivots between open and closed positions relative to the first support leg; and
   a slidingly extendable table top support leg extending between the table top and the first support leg, the table top support leg being slidingly extendable from a closed position to an open position, wherein sliding extension of the table top support leg from its closed position to its open position increases a length of the table top support leg,
   wherein the second support leg, the table top, and the extendable table top support leg are operatively connected to each other such that the second support leg, the table top, and the extendable table top support leg synchronously move between their open and closed positions, and
   wherein the table top and second support leg pivot in opposing rotational directions relative to the first support leg when the table top and support leg move into their respective open positions.

14. A collapsible table comprising:
   a table top;
   a first support leg pivotally connected to the table top, wherein the table top pivots between open and closed positions relative to the first support leg;
   a second support leg pivotally connected to the first support leg and operatively connected to the table top, wherein the second support leg pivots between open and closed positions relative to the first support leg, and wherein the second support leg operatively connects to the table top such that moving the table top into its open position moves the second support leg into its open position;
   a slidingly extendable table top support leg extending between the table top and the first support leg, the table top support leg having slidingly extended and retracted positions, wherein moving the table top into its open position moves the table top support leg into its extended position, wherein sliding extension of the table top support leg from its retracted position to its extended position increases a length of the table top support leg; and
   a locking mechanism that selectively locks the extendable table top support leg in its extended position.

15. The collapsible table of claim 14, wherein the extendable table top support leg pivotally connects to the table top.

16. The collapsible table of claim 7, wherein, when the second support leg is in its closed position, moving the load platform from its stowed to its open position locks the second support leg into its closed position.

17. The collapsible table of claim 1, wherein the extendable table top support leg pivotally connects to the first support leg for pivotal movement relative to the first support leg between open and closed positions.

18. The collapsible table of claim 17, wherein the table top and extendable table top support pivot in opposing rotational directions relative to the first support leg when the table top and extendable table top support move into their respective open positions.

19. The collapsible table of claim 1, wherein the pivotal connection between the table top and first support leg is spaced from the pivotal connection between the table top and the extendable table top support.

20. The collapsible table of claim 1, wherein the slidingly extendable table top support leg and the second support leg are operatively connected to each other such that movement of the slidingly extendable table top support leg from its closed position to its open position causes the second support leg to pivot from its closed position to its open position.

21. The collapsible table of claim 1, further comprising:
a first support brace pivotally connected to the second support leg at a first pivot axis; and
a second support brace pivotally connected to the table top support leg at a second pivot axis, wherein the first and second support braces pivotally connect to each other at a pivot point that defines a third pivot axis,
wherein the pivot point slidingly connects to the first support leg, and
wherein the first and second pivot axes are each spaced from the third pivot axis.

22. The collapsible table of claim 1, wherein the slidingly extendable table top support leg comprises a telescopically extendable table top support leg that is telescopically extendable from the closed position to the open position.

23. The collapsible table of claim 13, wherein the slidingly extendable table top support leg comprises a telescopically extendable table top support leg that is telescopically extendable from the closed position to the open position.

24. The collapsible table of claim 14, wherein the slidingly extendable table top support leg comprises a telescopically extendable table top support leg that is telescopically extendable between the extended and retracted positions.

25. The collapsible table of claim 1, wherein the slidingly extendable table top support leg comprises first and second table top support leg members that are connected to each other for sliding movement relative to each other between the closed and open positions.

26. The collapsible table of claim 13, wherein the slidingly extendable table top support leg comprises first and second table top support leg members that are connected to each other for sliding movement relative to each other between the closed and open positions.

27. The collapsible table of claim 14, wherein the slidingly extendable table top support leg comprises first and second table top support leg members that are connected to each other for sliding movement relative to each other between the retracted and extended positions.

* * * * *